Oct. 19, 1965    M. P. BENNETT ETAL    3,213,259
ELECTRODE FOR ELECTRICAL RESISTANCE HEATING TOOL
Original Filed May 23, 1961
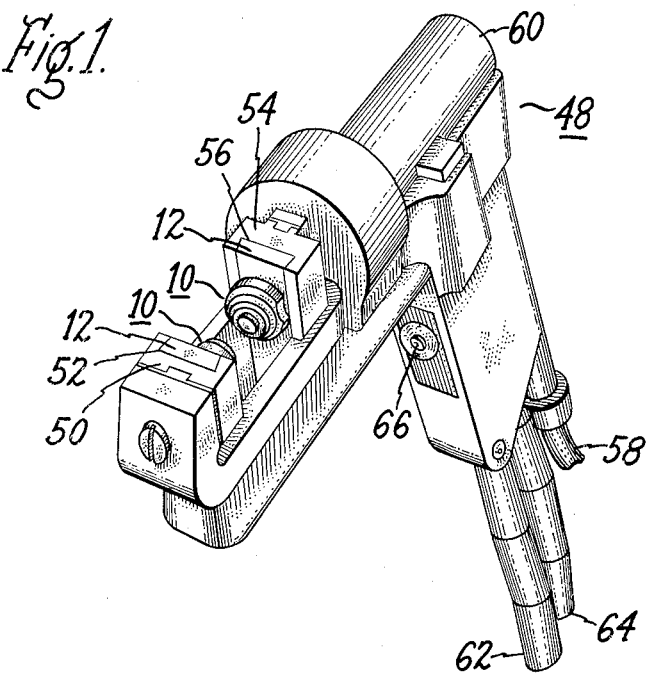
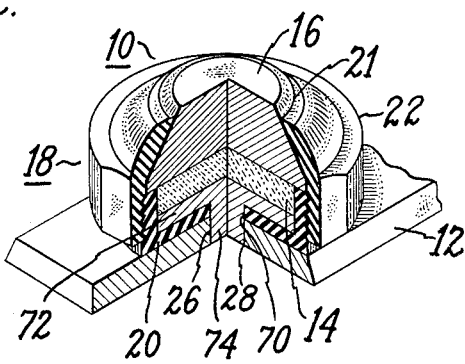
Inventors,
Moreland P. Bennett,
Edward L. Hughes,
by Francis K. Doyle
Their Attorney.

United States Patent Office 3,213,259
Patented Oct. 19, 1965

1

3,213,259
ELECTRODE FOR ELECTRICAL RESISTANCE HEATING TOOL
Moreland P. Bennett and Edward L. Hughes, Pittsfield, Mass., assignors to General Electric Company, a corporation of New York
Original application May 23, 1961, Ser. No. 111,940, now Patent No. 3,134,883, dated May 26, 1964. Divided and this application Nov. 13, 1963, Ser. No. 323,491
7 Claims. (Cl. 219—119)

This application is a division of application Serial No. 111,940 filed May 23, 1961 now Patent No. 3,134,883 issued May 26, 1964, for Electrode for Electrical Resistance Heating Tool, and is assigned to the same assignee.

This invention relates to an electrical resistance heating tool for brazing, welding, hot crimping and the like, and, more particularly to a novel electrode for use in such tool.

In the prior art brazing or welding tools, it has been common to use an electrical resistance heating system to heat the electrodes to a sufficient temperature for performing the desired operation. The most commonly used systems are provided with electrodes which are made of either metal or carbon. In general, carbon is desired as the electrode material, since it has a high electrical resistivity and thus very rapidly reaches elevated temperatures. Also, due to its high resistivity, minimum amounts of power are required to obtain the elevated temperatures. However, as will be well understood by those skilled in this art, the carbon electrodes have very poor wear resistance and quickly deteriorate in use. Thus, when a carbon electrode is used in a production tool, it is necessary to frequently replace the carbon electrodes. Further, the carbon is a relatively fragile material and easily breaks under pressure. For this reason, carbon electrodes are unsuited for use in tools where it is desired to make joints or connections requiring high pressure to properly form such joints or connections.

A second commonly used resistance heating system is provided with metallic electrodes. These electrodes generally have very good wear resistance and are able to withstand high pressures when making high pressure joints or connections. However, as compared to carbon, the metals have a low resistance. Therefore, they require large quantities of power to generate sufficient heat. In order to provide the desired heat to the electrodes, to perform the particular operation, it is necessary to conduct a large quantity of electrical power into the electrodes. Further, due to the low resistance of the metallic electrodes, they are very slow to heat up, thus necessitating a relatively long time period to obtain the proper temperature to form the desired connection.

From the above statements, it will be obvious that there is a great need in this art for an electrode which may be used in a resistance heating system, for welding or brazing and the like, that will provide rapid heating to elevated temperatures, that will provide long wear resistance in use, and will be able to withstand high pressures without breaking under the force of such pressure.

It is therefore an object of this invention to provide a novel electrode for use in brazing tools, and the like, that will quickly obtain elevated temperatures without deteriorating in use.

It is a further object to provide a novel electrode for electrical resistance heating tools, which is provided with good, wear-resistance characteristics and requires low power in operation.

It is a further object of this invention to provide a novel electrode for brazing tools, and the like, that will readily obtain elevated temperatures with low power

2 requirements, and which will be useful in making joints with high contact forces.

A still further object of this invention is to provide a novel electrode for use with brazing tools, and the like, which will combine good, wear-resistance characteristics with rapid electrical resistant heating characteristics.

In carrying out this invention in one form, an electrical resistance heating tool is provided with a pair of novel electrodes, each electrode comprises a conductor which is connectable to a source of electric power, a carbon heating element, and a metallic stud or contact. The carbon heating element and the metallic stud are retained in intimate contact in an enclosure or retaining means with the operating portion of the stud extending exteriorly of the enclosure or retaining means. Electrical connections are provided such that the electric current will flow from the conductor through the carbon element and into the metallic stud. The rapid heating of the carbon element will produce thermal heating of the metallic stud to rapidly raise the temperature of such stud. Further, the current flow through the metallic stud will also provide resistance heating to such metallic stud.

The subject matter which is regarded as the invention herein will be particularly pointed out and distinctly claimed in the claims appended hereto. However, it is believed that this invention and the manner in which its various objects and advantages are obtained, as well as other objects and advantages thereof, will be better understood from the following description, when taken in connection with the accompanying drawing, in which:

FIGURE 1 is a perspective view of one form of portable, hand-operated brazing or hot crimping tool, or the like, in which the electrodes of this invention may be utilized; and FIGURE 2 is a perspective view partially in section, showing one form of the novel electrode made according to this invention.

Reference will now be made to the drawing in which like numerals will be used to indicate like parts throughout the figures thereof.

In FIGURE 1 of the drawing, there is shown one type of portable, hand-operated electrical resistance heating tool, which may utilize the electrodes of this invention. The portable, hand-operated tool 48 is provided with a pair of electrodes 10. In the electrical resistance heating tool 48, the front electrode 10 is mounted in a stationary anvil 50 by any desired means, for example, by providing the conductor element 12 with beveled sides, as indicated in FIGURE 1, to fit within the slot 52 of the anvil 50. In the same manner, the second electrode 10 is fitted into a movable anvil 54 by means of the beveled conductor 12 fitting into the slot 56. Current is provided to the stationary anvil 50 and the movable anvil 54 by means of an electric power cord 58 which is connected to any desired source of electrical energy.

As will be well understood by those skilled in the art, the electrical energy may be provided to each of the anvils 50 and 54 continuously, but until a work piece is placed within the tool, and the electrodes 10, 10 are brought into contact with such work piece, there is no flow of electrical current. The movable anvil 54 is mounted on the rod of a hydraulic or pneumatic cylinder 60 which is fed through the hydraulic or air lines 62, 64, in a manner well understood by those skilled in the art. The cylinder 60 is actuated by means of a button or trigger 66 placed in the handle of the portable tool 48. No further description is considered necessary of the operation of the trigger 66 and the cylinder 60, since these are entirely conventional elements and are well known in the art.

It will be clear that the tool 48, as shown in FIGURE 1, may be used for making high pressure connections between work pieces as desired. The cylinder 60 may provide any desired pressure between the electrodes 10, 10. As will be well understood, the amount of pressure provided is entirely dependent upon the size of the cylinder 60 and the hydraulic fluid or air pressure provided thereto. By means such as the tool 48, high pressure contacts can be made utilizing the electrodes of this invention. As will be clear from FIGURE 2 of the drawing, each of the electrodes 10 comprises the conductor means 12, a carbon heating element 14, electrically connected to the conductor means 12, and a metallic contact or stud 16 in intimate contact with the carbon heating element 14. A retaining means or enclosure 18 holds the carbon heating element 14 and the metallic stud in intimate contact, as shown, insuring good thermal and electrical connection between element 14 and stud 16. Inasmuch as the electrodes 10 are provided with the metallic stud 16, and the carbon heating element 14, both retained within the retaining element 18, it will be understood that extremely high pressure may be applied to the electrodes without any damage to the carbon element 14.

Tests have shown that forces may be applied to the surface of the studs 16 in the range of 15–20,000 pounds without damage to the electrodes. Of course, it will be readily apparent that applying a force between 7 and 10 tons to a small carbon electrode would be completely impossible, because of the nature of the carbon element. However, by use of this invention, where the carbon is retained within the retainer means 18 and the metallic element 16 is provided in intimate contact therewith, it is very possible to provide these high forces on the electrodes without any damage to the carbon element.

In tests made on the electrodes of this invention, they have been found to have an unusually long life. Throughout many hours of testing it has been noted that there was no visible deterioration of the carbon heating element. It is believed that carbon has a tendency to deteriorate when heated in the air due to the combination of the carbon with oxygen from the air. In this invention, the enclosure or retaining means 18 substantially eliminates the air from contacting the carbon. This feature of the invention is considered to provide substantially indefinite life to the carbon heating element. Thus, it can be seen that by means of this invention, novel electrodes are provided which provide all of the desired objects hereinbefore set forth.

Referring now to FIGURE 2 of the drawing, one form of the novel electrode of this invention is shown. As shown in FIGURE 2, the electrode 10 is connected to a conductor 12, shown as being provided with beveled sides so as to fit within the slots 52, 56 of the anvils 50, 54, respectively, of the portable tool 48. Of course, it will be understood that the conductor 12 could be of any desired form to cooperate with any type of electrical resistance heating tool. The retaining means 18 comprises a bottom portion 20 which is provided with an opening therein, indicated at 70, and an upper clamping ring 22. As shown by the cross hatching of the cross section in FIGURE 2, the lower portion 20 of the retainer element 18 and the upper clamping ring 22 are made of an insulating material, such as a heat resistant synthetic resin, so as to confine the flow of electric current in electrode 10 to the carbon element 14 and the metallic stud 16. In order to provide the desired electrical contact between the carbon element 14 and the conductor means 12, a metallic means 72 is provided, fitting within the bottom of base member 20 and having a boss means 74 which extends through the opening 70 in the base 20 and into the opening 26 in the conductor means 12. The boss 74 is firmly secured to the conductor means 12 in any desired manner, welding being indicated at 28, for illustrative purposes only.

In the preferred assembly of the electrode shown in FIGURE 2, it can be seen that the base element 20 of the retaining means 18 is shaped to receive the carbon heating element 14 and the metallic conductor means 72. The interior of the base 20 of the retainer means is preferably dimensioned such that the carbon heating element 14 fits snugly therein. The metallic stud 16 is then placed on top of the carbon heating element 14. The upper portion of the retaining means, referred to as the clamping ring 22, is then placed over the stud 16 and threaded to the base member 20. The clamping ring 22 is tightened on to the base member 20, so as to force the metallic stud 16 into a firm and intimate contact with the carbon heating element 14. As can be seen from FIGURE 2, the metallic stud 16 is of a frustroconical shape and the interior of the clamping ring 22 is provided with a similar contour, such that the tightening of the clamping ring 22 onto the lower portion 20 of the retainer means 18 will firmly force the stud 16 into intimate contact with the carbon heating element 14. An opening 21 is provided in the clamping ring 22, through which the operating portion of the metallic stud 16 may extend or protrude, when the clamping ring 22 is in place. Of course, it will be understood that the stud 16 may be of any desired shape. It is preferred that the stud 16 and clamping means 22 be formed so that the clamping means 22 will force the stud 16 into a good thermal and electrical contact with the carbon heating element 14.

From the above it can be seen that the novel electrode of this invention is comprised of a combination of a heating element 14 of carbon, to provide for rapid heating on the passage of current therethrough, and a metallic stud 16, which contacts the desired work piece, providing an extremely strong, wear-resistant surface. Further, the stud 16 and the carbon heating element 14 are held in intimate contact by retaining means 18, enabling excellent thermal conduction between the heating element 14 and the stud 16, thereby providing rapid heating of the metallic stud. Of course, the current flow through the metallic stud 16 encounters the electrical resistance of such stud, further heating the stud by the resistance heating due to such current flow. More specifically, as current flows through the carbon element 14, the carbon is rapidly raised to an elevated temperature. The heat of element 14 is rapidly conducted to study 16 by thermal conduction. As the temperature of the carbon element 14 increases, it progressively loses its resistivity. This makes the element 14 a better conductor, allowing more current to flow through metallic stud 16. Obviously, the more current that flows through stud 16 by thermal conduction. As the temperature generate heat. Further, as the temperature of stud 16 increases, it reacts in an opposite manner to the carbon element 14, that is, its electrical resistance increases. Therefore, it will be apparent that the stud 16 is first rapidly heated by thermal conduction from the carbon element 14 and then continues to be heated to higher temperatures by the combination of thermal conduction from the carbon element 14 and resistance heating due to its own resistivity.

While there has been shown and described one of the presently preferred embodiments of the electrode of this invention, as required by the patent statutes, it will be well understood by those skilled in the art that various changes and modifications may be made in this embodiment. Of course, it will be understood, that the electrode of this invention is not limited to the particular type of tool shown but may be utilized in any type of brazing, welding, hot crimping, or similar tool, portable or stationary, where the advantages of this electrode may be obtained. It is therefore to be understood, that the descripion hereinbefore set forth is not to be considered as a limitation of the invention, but, that changes may be made within the spirit and scope of this invention as set forth in the appended claims.

What is claimed as new and which it is desired to secure by Letters Patent of the United States is:

1. In an electrical resistance heating tool having opposed electrodes provided with work contacting portions and means for moving the electrodes toward each other wherein electrical current is caused to flow through the electrodes by a work piece between the electrodes in contact with the work contacting portions, the improvement in which at least one electrode comprises;

a conductor means connectable to one side of an electrical energy source;

a carbon heating element electrically connected to said conductor means;

a metallic stud in electrical and thermal contact with said carbon heating element;

said metallic stud having an operating portion adapted to contact a work piece;

a retaining means holding said carbon element and said stud in intimate contact;

said retaining means forming an enclosure for said carbon element and said stud and having an opening therein through which said operating portion of said stud protrudes;

said retaining means made of an electrical insulating material whereby current from said conductor means will flow through said carbon element and said stud.

2. An electrode as claimed in claim 1 in which conducting means are provided between said carbon element and said retaining means, said conducting means electrically connecting said carbon element to said conductor means.

3. An electrode as claimed in claim 1 in which cooperating means are provided on said stud and said retaining means for forcing said stud into intimate contact with said carbon element.

4. An electrode as claimed in claim 3 in which said cooperating means comprises a frustro-conical shaped stud and a two piece retaining means having an upper and lower portion, said upper portion being removably secured to said lower portion, said upper portion having its inner surface of frustro-conical shape whereby when said upper portion is secured to said lower portion said inner surface engages said stud forcing said stud into contact with said carbon element.

5. An electrode as claimed in claim 4 in which conducting means are provided between said carbon element and said lower portion of said retaining means, an opening provided in said lower portion, said conducting means having a portion extending through said opening electrically and mechanically connected to said conductor means, said conducting means electrically connecting said carbon element to said conductor means and mechanically securing said lower portion of said retaining means to said conductor means.

6. An electrode as claimed in claim 5 in which said retaining means and said conducting means provide a support for said carbon element whereby high pressure may be exerted on a work piece by said operating portion of said stud without damaging said carbon element.

7. An electrode as claimed in claim 1 in which said retaining means and said stud enclose said carbon element to substantially eliminate air contacting said carbon element.

References Cited by the Examiner

UNITED STATES PATENTS

| | | | |
|---|---|---|---|
| 497,793 | 5/93 | Jenkins | 219—233 |
| 1,330,563 | 2/20 | Weed | 219—120 |
| 2,346,088 | 4/44 | Shobert | 219—119 |

RICHARD M. WOOD, *Primary Examiner.*

ANTHONY BARTIS, *Examiner.*

UNITED STATES PATENT OFFICE
CERTIFICATE OF CORRECTION

Patent No. 3,213,259                            October 19, 1965

Moreland P. Bennett et al.

It is hereby certified that error appears in the above numbered patent requiring correction and that the said Letters Patent should read as corrected below.

Column 4, lines 52 and 53, strike out "by thermal conduction. As the temperature generate heat" and insert instead -- , the more effective is its electrical resistance to generate heat --; same column 4, line 75, for "of" read -- on --.

Signed and sealed this 26th day of July 1966.

(SEAL)
Attest:

ERNEST W. SWIDER                            EDWARD J. BRENNER
Attesting Officer                                  Commissioner of Patents